United States Patent [19]
Davis et al.

[11] Patent Number: 5,008,952
[45] Date of Patent: Apr. 16, 1991

[54] GLOBAL SATELLITE COMMUNICATION SYSTEM WITH GEOGRAPHIC PROTOCOL CONVERSION

[75] Inventors: Walter L. Davis, Coral Springs; Philip P. Macnak, West Palm Beach, both of Fla.

[73] Assignee: Motorola, Inc., Schaumburg, Ill.

[21] Appl. No.: 431,105

[22] Filed: Nov. 3, 1989

[51] Int. Cl.$^5$ .......................................... H04B 7/185
[52] U.S. Cl. ...................................... 455/12; 455/33; 340/825.44
[58] Field of Search ....................... 455/12, 13, 32, 33; 358/140; 340/824.44; 342/350, 354, 355, 356; 370/13.1, 16

[56] References Cited

U.S. PATENT DOCUMENTS

| | | | |
|---|---|---|---|
| 3,497,807 | 2/1970 | Newton . | |
| 4,178,476 | 12/1979 | Frost . | |
| 4,518,961 | 5/1985 | Davis et al. | 340/825.44 |
| 4,644,347 | 2/1987 | Lucas et al. . | |
| 4,775,974 | 10/1988 | Kobayashi | 370/94.1 |
| 4,914,649 | 4/1980 | Schwendeman et al. | 455/32 |

Primary Examiner—Reinhard J. Eisenzopf
Assistant Examiner—Lisa Charouel
Attorney, Agent, or Firm—Philip P. Macnak; Vincent B. Ingrassia; William E. Koch

[57] ABSTRACT

A satellite paging system is described for providing geogrpahic protocol conversion for data packet delivery to communication receivers located in a plurality of geographic areas. The system includes a transmitter for transmitting data packets formatted in a first predetermined data format to the communication satellite. The satellite includes a receiver for receiving the data packets and a programmable encoder coupled to the receiver for encoding the received data packets into encoded data packets in a second predetermined data format corresponding to the signaling requirements of each geographic delivery area. A satellite transmitter coupled to the programmable encoder then transmits the encoded data packets in the second predetermined data format to a portable communication receiver, operable in the second predetermined data format in the geographic delivery area.

48 Claims, 12 Drawing Sheets

GLOBAL SATELLITE COMMUNICATION SYSTEM WITH GEOGRAPHIC PROTOCOL CONVERSION

BACKGROUND OF THE INVENTION

1. Field of the Invention

The present invention relates to global satellite communication systems and more particularly to a global satellite communication system providing signaling protocol conversion based on geographic coverage provided.

2. Description of the Prior Art

Numerous nationwide communication systems, such as nationwide paging systems, have been proposed and a number of such systems are currently in operation around the world. While these systems fulfill the need to deliver information on a limited nationwide basis, they fall short of providing true nationwide information delivery. This is due to the fact that such nationwide systems were limited only to those service areas where the nationwide system service provider had a communication system infrastructure in place, which was generally only in the major metropolitan areas. Such nationwide systems have provided a centralized message input, or collection, point to which all messages to be handled by the system were directed. The messages were then distributed by landline or by satellite to each of the cities in the network. The messages, as they were received in each of the network cities, were then processed as a conventional message for transmission throughout the local systems. Because the messages were transmitted throughout the nationwide system, problems with message throughput are expected as the number of subscribers belonging to the system increases.

Networking such nationwide systems to provide information delivery on a global basis reaching far beyond the immediate boundaries of the nationwide system service provider is a goal of many of these systems. However, such systems would at best, only provide limited global system coverage in the manner described for the present nationwide systems. It would also be anticipated that the problems with message throughput would become even more severe when the messages are distributed throughout the global system, and transmitted in each of the cities making up the global system.

One solution to the problem of limited nationwide paging coverage, and complete global paging coverage, is by means of a satellite based communication system, in which the satellite, or satellites, would be active in transmitting the messages directly to the ground based communication receivers. The success of such a satellite based communication system would depend directly on how many users can be covered by the system to help defray the very high costs associated with satellite systems. In addition, the acceptance of a global communication system would depend on the utility the system offers the end-users.

Acceptance of a satellite based communication system is complicated by the fact that there are several "standard" paging protocols in use around the world. These paging protocols include such digital signaling formats as the Golay Sequential Code (GSC) and POCSAG signaling formats, and such analog tone signaling formats as the Motorola 5/6-tone signaling format and the ZVEI and CCIR 6-tone signaling formats. Many other signaling formats are in use, as well, around the world. New signaling standards, such as the ERMES European paging standard will also be in place in the future. To facilitate a global satellite paging system, the system would have to provide service in a number of signaling formats in order to gain the broad acceptance required to make such a system cost effective. By providing information delivery in a number of signaling formats, messages may be inputted into the system anywhere in the world and would be effectively delivered directly to the end-user anywhere in the world, without requiring the end-user to have a pager capable of decoding a particular signaling format dedicated to the global satellite based communication system.

In addition to the problems associated with processing multiple signaling formats, the assignments of operating frequencies for pagers operating in the global system is subject to national and regional conventions regulated by the International Telecommunications Union (ITU) and national regulatory agencies, such as the Federal Communications Commission (FCC), as the communication satellite sweeps over the earth. This would require the satellite paging system to adhere to the local laws and regulations in a particular nation or region in order that service be provided on a global basis. Such a satellite based communication system must be capable of selectively transmitting over limited geographic areas on a number of different operating frequencies.

Pagers operating within the system which allow the end-user to roam, or travel, from place-to-place throughout the world would also need to be frequency-agile, in order for the pager to maintain communication with the satellite transmissions throughout the world. However, because the satellites are capable of delivering messages in a variety of signaling formats, the requirement of the pager to process different signaling formats is eliminated.

SUMMARY OF THE INVENTION

It is an object of the present invention to provide a communication system providing global communication coverage.

It is a further object of the present invention to provide a global communication system which is satellite based.

It is a further object of the present invention to provide a satellite based communication system providing improved message throughput.

It is a further object of the present invention to provide a satellite based communication system providing geographical signaling protocol conversion.

In a first embodiment of the present invention, a global satellite paging system is described which provides geographic protocol conversion for data packet delivery to paging receivers having different signaling requirements in a plurality of geographic areas. Data packets are transmitted to the satellite in a first predetermined signaling format which provides high message throughput. Within the satellite the data packets received in the first predetermined signaling format are converted to a second predetermined signaling format which corresponds to that required for message transmission to paging receivers located in each geographic area traversed by the satellite.

In a second embodiment of the present invention, the data packets are transmitted to an earth based satellite station in a first predetermined signaling format which provides high message throughput. The data packets are converted at the earth based satellite station from the first predetermined data format to a second predetermined data format which corresponds to that required for message transmission to paging receivers located in each geographic area traversed by the satellite.

For either embodiment of the present invention, both synchronously and non-synchronously orbiting satellites can be employed.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the, accompanying drawings, in the several figures of which like reference numerals identify identical elements, in which, and wherein:

DESCRIPTION OF THE PREFERRED EMBODIMENTS

With respect to the figures, FIGS. 1 through 10 illustrate the preferred embodiment of a satellite based communication system providing geographical protocol conversion. Reference is directed to FIGs. 1A and 1B which show a first embodiment for a configuration of the global satellite communication system providing geographical protocol conversion of the present invention. As shown in FIG. 1A, one or more satellites 10 (only one of which is shown) are positioned in synchronous orbits for transmitting communication signals to the earth using an antenna 12 with a steerable beam. The steerable beam antenna is used to focus a transmitted radio frequency signal on a small geographical area, such as indicated by the beam footprint of area 14 of FIG. 1A. Such focusing of the transmitted signal produces sufficient ground level signal strength to provide adequate performance of ground based communication receiving equipment, such as paging receivers or pagers, operating within the boundaries of area 14. Wide area coverage is obtained in the system by moving, or steering, the beam to point at different geographical areas 14 on the earth as shown in FIG. 1B. In the system of FIG. 1A, the satellite can also change the signaling protocol and/or the down link frequency when serving customers in different geographical areas. As for example, the down link signal would be transmitted at a frequency of 1.5 Gigahertz (GHz) using the POCSAG signaling format for pagers located in the geographical areas indicated by the letter B for the geographic areas within Europe in FIG. 1B. The down-link signal would be transmitted at a frequency of 900 Megahertz (MHz) using the Golay Sequential Code (GSC) signaling format for pagers located in the geographical areas indicated by the letter A for North and Central America. It will be appreciated, the choice of down link frequency is not arbitrary, but is controlled by the various national regulatory agencies in each country or geographic area covered by the beam footprint, as such, actual transmitter frequencies may vary widely as operating frequencies are assigned within the satellite based communication system.

Figure 1A:
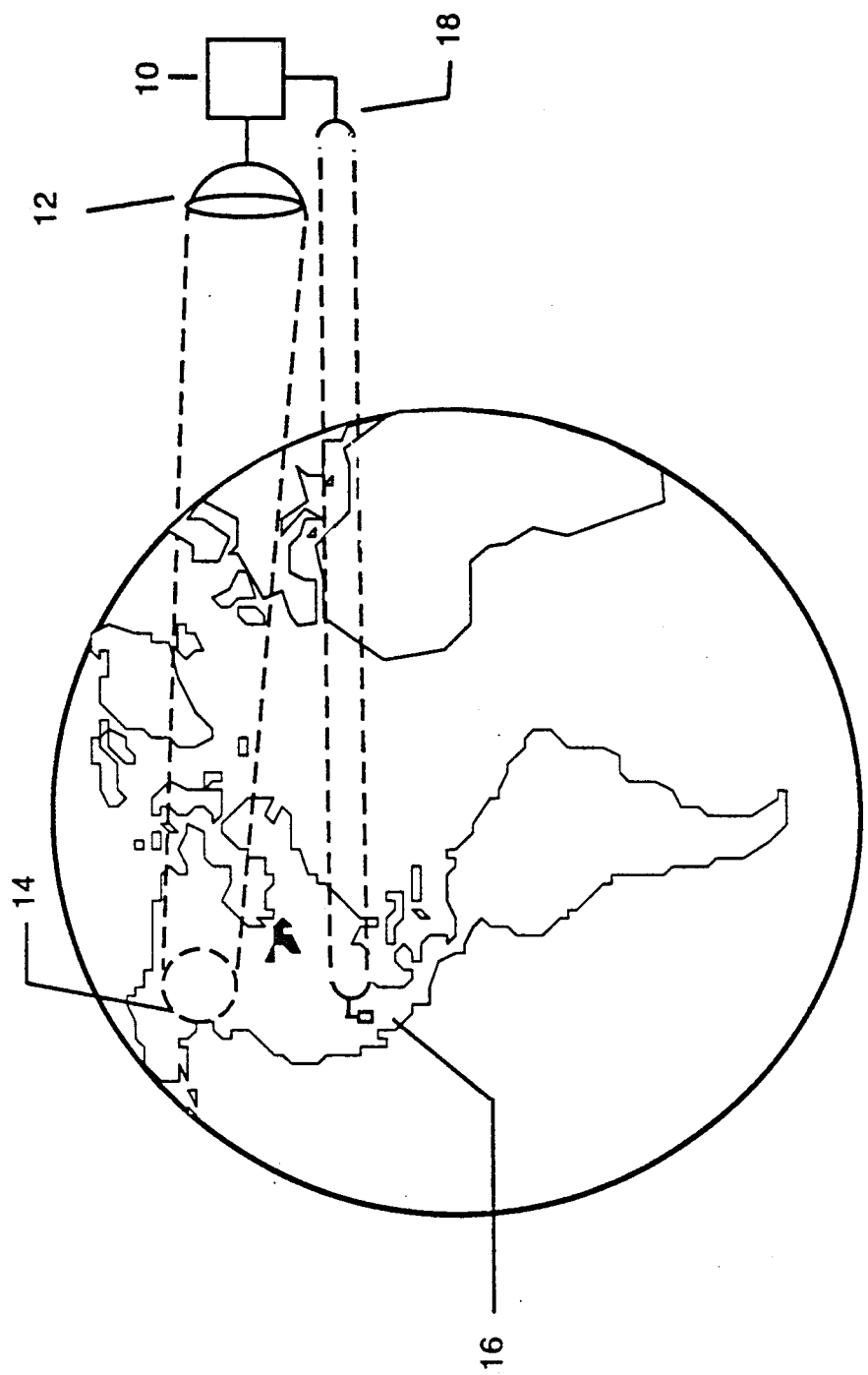
FIGS. 1A and 1B are pictorial representations of a synchronous satellite configuration for a satellite based communication system providing geographical protocol conversion of the present invention.
Figure 1B:
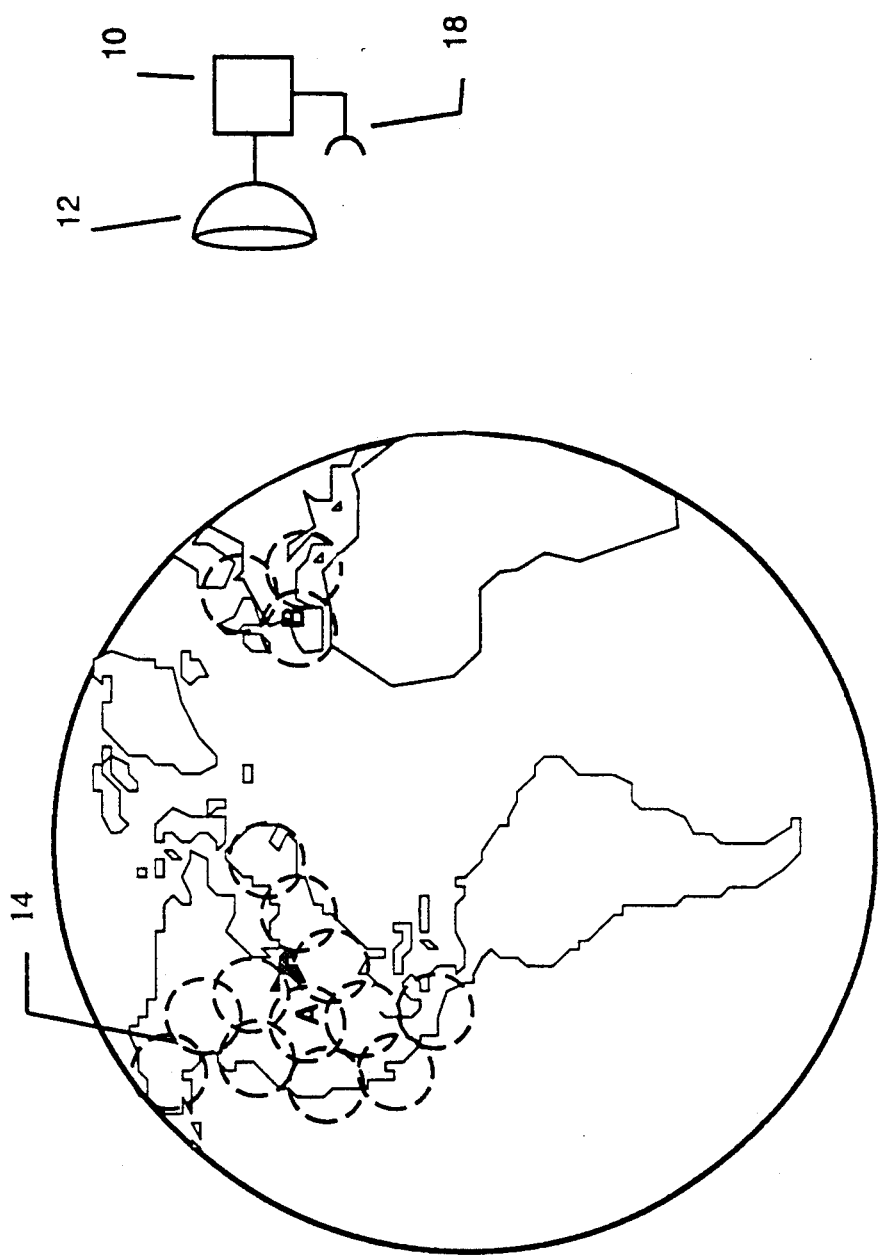

Entry of the messages into the satellite based communication system is through the public switched telephone network (PSTN) which directs the messages to a ground station 16, or gateway, for transmission of information to the synchronous satellite 10 by way of uplink antenna 18, as shown in FIG. 1A. In the preferred embodiment of the present invention, three synchronous communication satellites at an altitude of approximately 35,000 KM would provide total global coverage with ground stations, such as gateway 16, suitably located around the world to communicate with a corresponding synchronous satellite. The format of the information being transmitted to and from the satellite to provide the geographical protocol conversion of the present invention will be described in detail shortly.

When multiple synchronous satellites are employed in the satellite communication system of the present invention, message information received at any of the ground stations is transferred to the corresponding satellites. However, it will be appreciated, some of the message information transferred to the particular satellite may be directed to pagers which are located in geographical areas not covered by the particular satellite receiving the message information. In this instance, intersatellite communications is provided between each of the synchronous satellites in orbit which allow the transfer of message information to the appropriate satellite which will ultimately deliver the messages to the pagers in a particular geographical area. Intersatellite communications will be described in further detail later in the specification.

Figure 2:
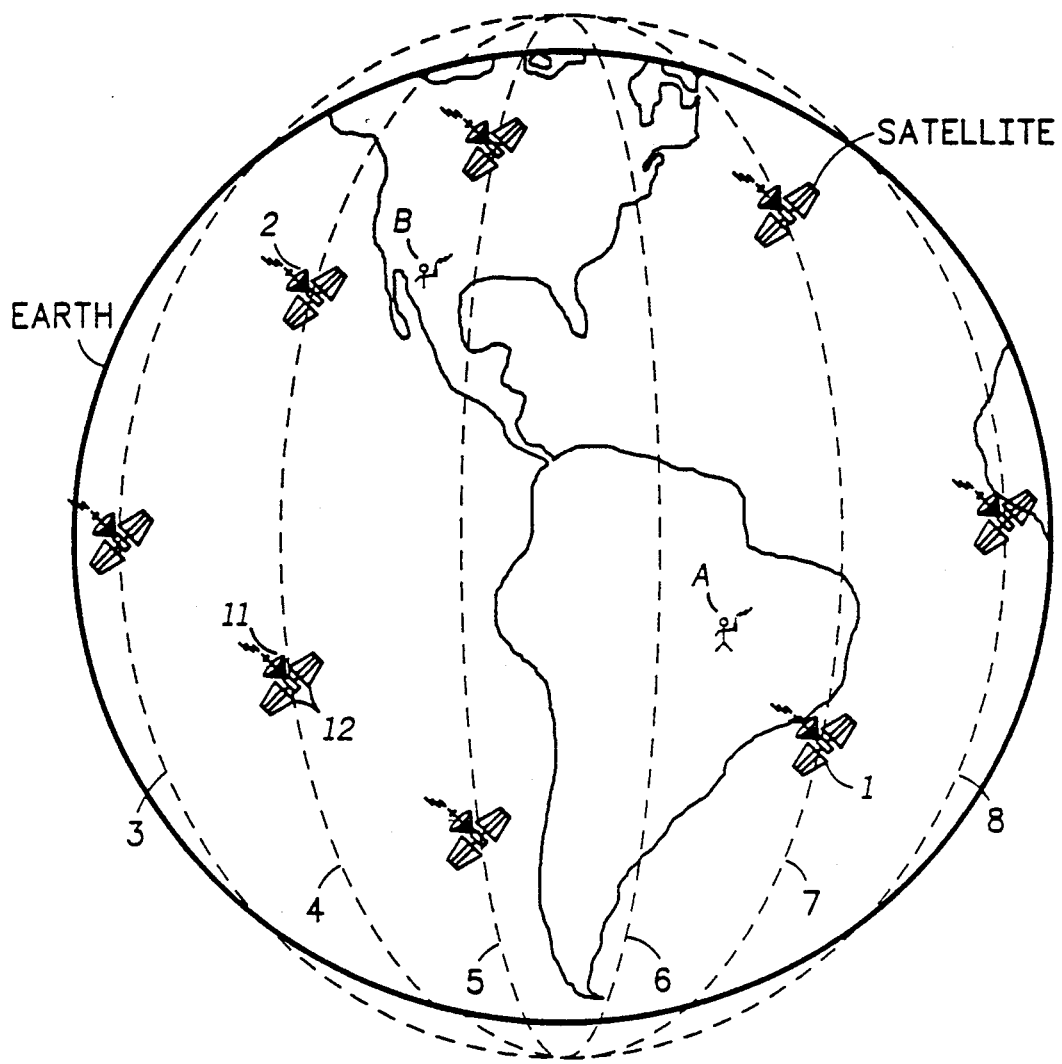
FIG. 2 is a pictorial representation of a non-synchronous satellite configuration for a satellite based communication system providing geographical protocol conversion of the present invention.

Referring to FIG. 2, a second embodiment of a satellite configuration for a global satellite based communication system is shown. In this configuration, a plurality of satellites are shown in non-synchronous, low earth orbits. The satellites are placed in a number of orbiting planes. The orbiting planes (3 through 8), as shown, are highly inclined in nature and provide paging coverage for the entire earth. With this system, as with the synchronous satellite based communication system of FIG. 1, users located anywhere on a land mass, on the water or in the air at an altitude less than that of the orbiting satellites may be paged by anyone having access to the public switched telephone network.

In the preferred embodiment of the non-synchronous satellite based communication system of the present invention, eleven satellites are placed in each of seven orbiting planes at an altitude of 413.53 nautical miles (765.86 kilometers) to provide complete global coverage, with each satellite in this orbit completely circling the globe approximately once every 100 minutes. It will be appreciated by one of ordinary skill in the art that the number of satellites required in the system of FIG. 2, the altitude and the orbit time are a function of how highly inclined are the orbiting planes. Lower inclined orbiting plane configurations would require more satellites than more highly inclined orbiting plane configurations. It will also be appreciated the number of satellites described in the preferred embodiment of the satellite based communication system is by way of example only, and other satellite configurations including a greater number, or a fewer number could be utilized depending upon the particular system requirements.

Each satellite in either the synchronous or non-synchronous satellite based communication system contains a satellite control systems unit, suitable antennas 11 (helical antennas for up/down links and for cross links, for example) and an unfolding array of solar cells 12 along with storage batteries (not shown) connected to the solar cells to provide power to the control systems unit, and a satellite paging controller to provide the necessary geographic protocol conversion. The satellite vehicles themselves are low-earth orbiting satellites such as those commercially available for the non-synchronous satellite based communication system. The satellites in the non-synchronous as well as the synchronous systems, are put into orbit by a launching vehicle. When in orbit, the solar cell array is opened and the switching unit thereby activated. The satellites are then individually brought on line via standard telemetry, tracking and control (TT&C) channels to form the satellite based communication system.

Figure 3:
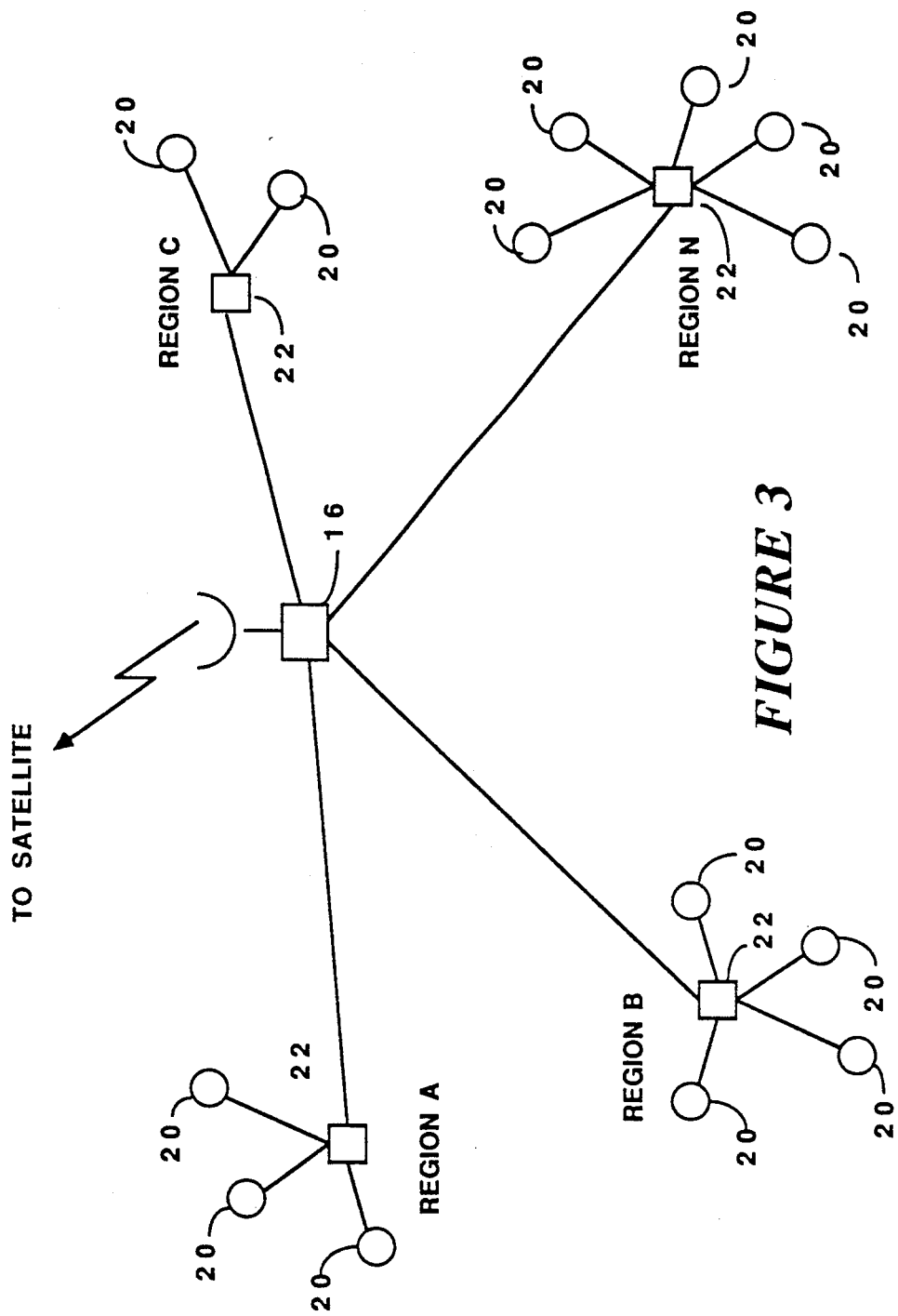
FIG. 3 is a diagram depicting a global telecommunication network used to receive and process messages for the satellite based communication system of the present invention.

In operation, messages are entered into the satellite based communication system from anywhere in the world through the public switched telephone network (PSTN). FIG. 3 depicts a typical interconnection of a portion of the global satellite network which may be used for entry of messages into the satellite based communication system of the present invention. The global satellite network comprises local input nodes 20 and regional input and/or collection nodes 22 which act to concentrate and channel the messages into the satellite based communication system. The local input nodes 20 comprise terminals (not shown), such as paging terminals, which are well known in the art, to receive and process the messages received through the public switched telephone network. The local input nodes 20 are generally located at the facilities of the local paging service providers participating in the global satellite network, and as such, provide both the capability for controlling local paging services, and message handling and processing for the satellite based communication system as well. A large metropolitan area, such as indicated as Region B, can have multiple local input nodes 20, representative of a number of local paging service providers which are participating in the global satellite network. Other geographic areas, such as indicated by Region A could represent local paging service providers located in major metropolitan areas located throughout a country, such as Canada.

The messages directed to the global satellite network are routed from the local input node 20 to the regional input, or collection node 22. Regional collection node 22 acts to further concentrate the messages from each of the local input nodes 20 for a particular geographic area, such as the large metropolitan area, a state, a country, or even a continent. The regional concentration of messages provides the most cost effective means for transmission of the messages to the trunk site 16. Because of the large volume of message traffic which must be handled to fulfill the economic requirements of a satellite based system, it is important that the transmission time required to transmit the messages received throughout the global satellite network be minimized. Message throughput is improved in the system of the present invention by not encoding the messages received at the local inputs nodes into the final signaling format prior to transmission to the trunk site. The messages are transmitted from the local input node 20 to the regional collection node 22, or from the local input node 20 to the trunk site 16 as raw data, such as BCD (binary coded decimal) or ASCII data. It will be appreciated by one skilled in the art, substantial transmission time is saved by only transmitting the raw data using conventional data transmission techniques which are well known in the art, as compared to transmitting the data encoded into the final encoded signaling format, which multiplies the data handling requirements by as much as a factor of two or more.

Interconnection of the network between the local input nodes 20 and the regional input nodes 22, and the regional input nodes 22 to the trunk site 24 may be provided by any of a number of well known methods, such as landlines, and microwave or satellite communications, depending on the distances involved and the volume of message traffic being handled from any given input node. It will be appreciated that the structure of the global satellite network described is by way of example only, and is representative only of a system for concentrating and processing the volume of information which is anticipated in a satellite based communication system.

Figure 4:
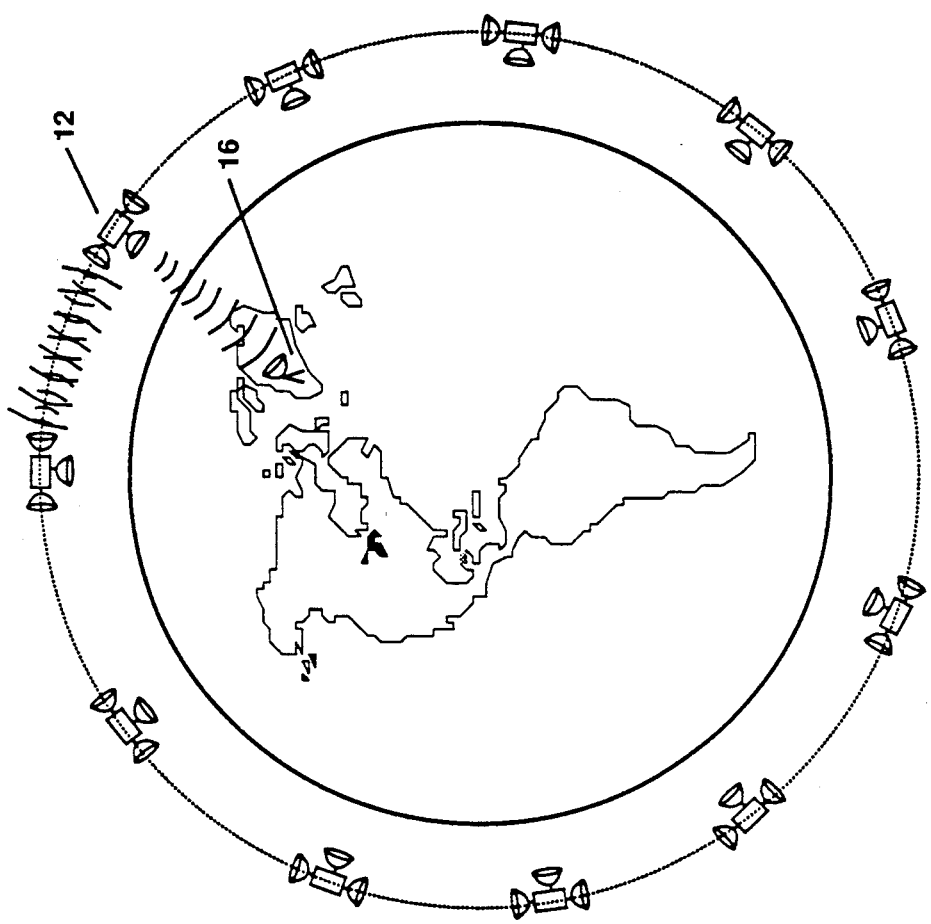
FIG. 4 is a diagram illustrating the ground station to satellite communication for the non-synchronous satellite based communication system of the present invention.

FIG. 4 shows a diagram of the relative positioning for a number of non-synchronous satellites orbiting in any one of the plurality of orbiting planes, as described for FIG. 2. An up-link transmitter, or gateway, 16 is provided to transmit the message data received from throughout the system to each of the orbiting satellites 12 as they pass substantially over the gateway 24. Since all satellites in the global satellite based communication system are in orbits which pass over the poles, as previously described in FIG. 2, only a single gateway 16 is required to access each of the satellites for control and for message delivery from the gateway 16, as shown. It will be appreciated, the position of the gateway shown is by way of example only, and other geographic locations throughout northern North America would be suitable for locating the gateway 16.

Figure 5:
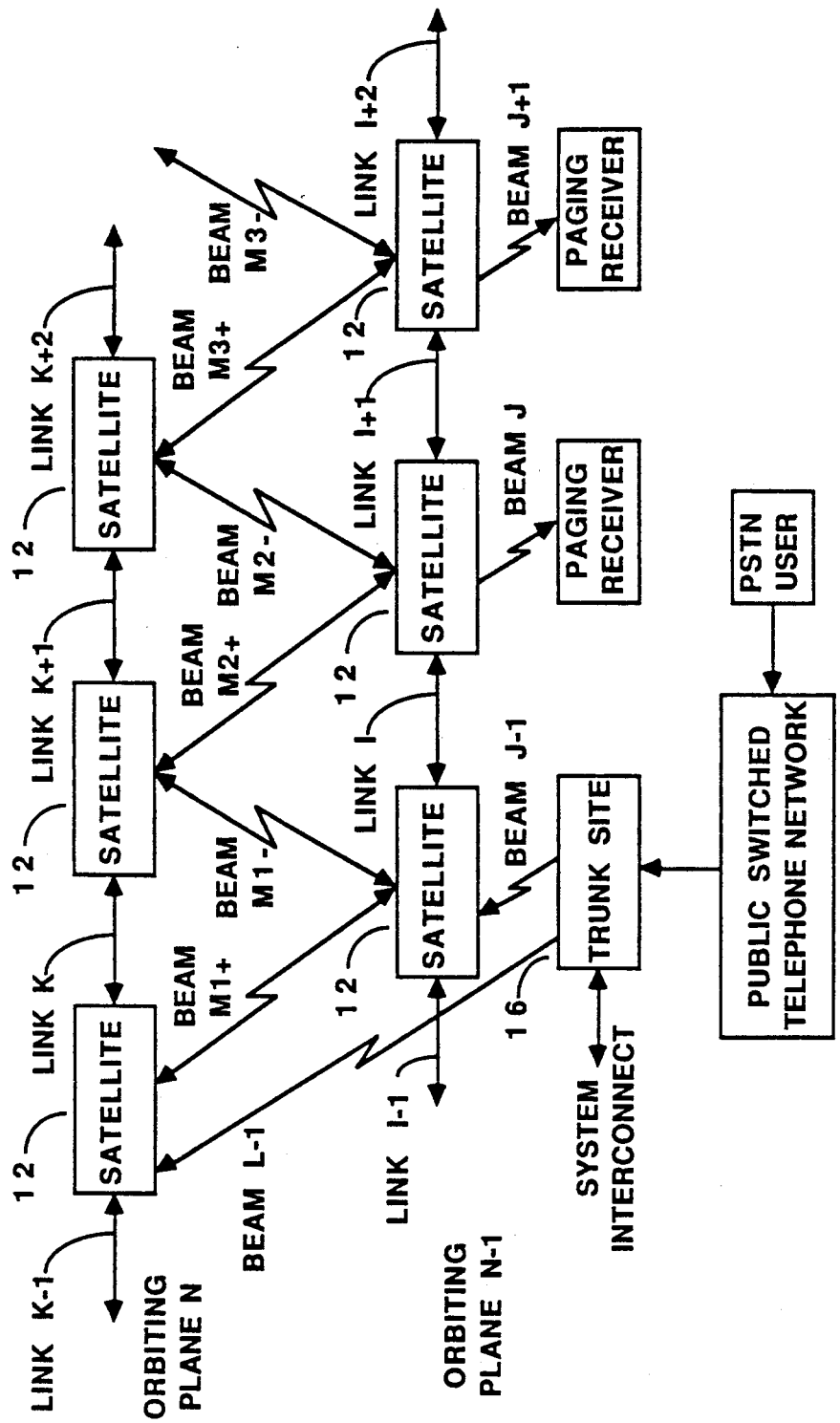
FIG. 5 is a diagram illustrating the intersatellite communication for the non-synchronous satellite based communication system of the present invention.

As shown in FIG. 5, messages received via the public switched telephone network from a PSTN user are routed to the trunk site 16, in a manner similar to that described for FIG. 3. The message information is independently beamed up to each satellite 12 in an orbiting plane as each satellite 12 appears substantially overhead via beams J-1, L-1, etc. Each satellite 12 in a particular orbiting plane is also linked via intersatellite communication to the next satellite and previous satellite, as indicated by example by link I-1, link I, link I+1, and so on, for satellites orbiting in plane N-1. This intersatellite communication system provides a means for distributing messages received by any particular satellite 12 in one orbiting plane to each and any of the other satellites 12 located in the same orbiting plane, or any other orbiting plane. In the latter case, intersatellite communication is provided in the system between one or more satellites 12 in other orbiting planes, as indicated by beam M1+ and M1−, and so forth for satellites 12 orbiting in planes N and N-1. That is each satellite 12 in a given orbiting plane is linked to a previous satellite (beam M#−) and the next satellite (beam M#+) in an adjacent orbiting plane, thereby providing a means for re-distributing the received global message information throughout the entire satellite system. The intersatellite links are implemented via data transmission on a communications channel, such as a microwave beam or via a laser beam. Existing technologies currently provide for such data transmission. It will be appreciated, that while the previous description described intersatellite communication for a satellite system utilizing non-synchronous satellites, a similar system is can be used with synchronous satellites.

As previously described in FIG. 2, each satellite in the non-synchronous satellite system of the present invention completely circles the globe every 100 minutes. Since each orbiting plane is occupied by eleven satellites in the preferred embodiment of the present invention, a new satellite appears substantially over any geographic area approximately once every nine minutes from any one orbiting plane. Since there are seven satellite orbits provided in the non-synchronous satellite system of the present invention, a new satellite from one of the seven satellite orbits appears substantially over the gateway 16, once every one minute and eighteen seconds. As a result, global message information and control information is transmitted from the gateway 16 to one of the eleven satellites in one of the seven orbiting planes which regularly appears over the gateway 16. Thereafter, the global message information is processed on-board the receiving satellite, as will be explained in further detail later, for further distribution of the information to the other satellites located around the world, or is transmitted by the receiving satellite to those communication receivers falling in the present track of the receiving satellite.

As previously described, global message information entered into the satellite based communication system of the present invention is forwarded from the local inputs nodes 20 to the gateway 16 without being processed into a particular signaling format. In one embodiment of the present invention, the global message information is processed into the appropriate signaling format for the pager to which the information is directed, prior to the transmission from the gateway 16 to the overhead receiving satellite. In an alternate embodiment of the present invention, the global message information is transmitted from the gateway 16 to the overhead receiving satellite without processing into the final signaling format. In this instance, the final processing into the appropriate signaling format occurs within the particular satellite which is to ultimately deliver the message. The operation of both embodiments of the present invention will become more apparent in the description to follow.

Figure 6A:
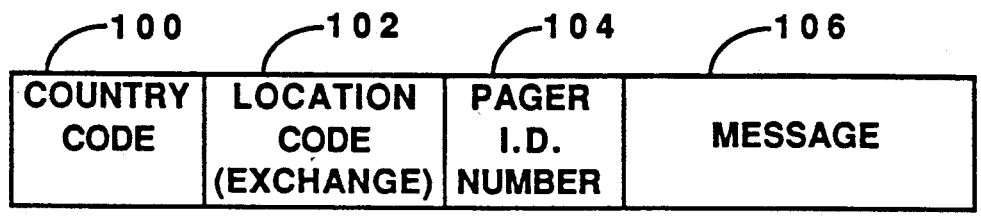
FIGS. 6A and 6B are timing diagrams illustrating formats for entering messages into the satellite based communication system of the present invention.

FIG. 6A, shows one possible format for the entry of information by a message originator through the public switched telephone network. It will be noted, FIG. 6A shows a format that is very similar to that used for international telephone service. That is, the format contains a country code 100, an exchange or location code 102, and a pager I.D. number 104 followed by the message 106. This format would be used when the message originator knows the particular country code 100 and location code 102 information for the pager to which the message is intended. The country code 100 and the location code 102 information is processed at the trunk station to determine satellite routing information which will be described in detail shortly. The routing information defines which satellite in the synchronous or non-synchronous satellite systems will be in position to deliver the message at the earliest time. The country code 100, location code 102, pager I.D. number 104, message portion 106 and the orbiting information are transmitted from the trunk station to the satellite currently overhead. Once received, the routing information is processed, as will be described shortly, to forward the message to the delivery satellite anywhere around the globe. The message delivery satellite uses the country code 100 and location code 102 information to determine the appropriate down link frequency and signaling protocol for message delivery. In one embodiment of the present invention, the information transmitted from the trunk station to the satellites is not encoded, except for that required to guarantee reception at the satellite overhead. The I.D. Number 104 and the message 106, which were received in an ASCII data format, are encoded by the delivery satellite into the appropriate signalling format for the geographic delivery area, such as the POCSAG or GSC signaling formats. At the appropriate time, when the delivery satellite passes over the geographic area determined by the country code 100 and the location code 102 information, the message is beamed down to deliver the message to the intended pager.

Figure 6B:
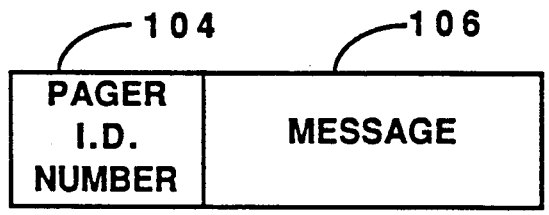

FIG. 6B shows an alternate format for message entry, wherein the country code 100 and location code 102 information is automatically provided by the system based on the current location of the pager to which the message is being directed. In this embodiment, the current location of each pager in the system is tracked in the terminal associated with the local paging system to which the pager is assigned. When the user is in the home, or local system area, messages entered through the local input node, are directed for transmission on the local nonsatellite system. However, when the user plans to leave the local area, such as for a business trip from Chicago to Singapore, the user would call in to the paging service provider to indicate the destination, and departure and arrival times. The system thereafter automatically adds the country code 100 and the location code 102, to the pager I.D. number 104 and the message 106 entered by the message originator. The system thereafter automatically routes the message through the satellite system, as previously described, to the proper geographic area, adding the appropriate country code 100 and location code 102, when the user is away from the local system, and omits the country code 100 and the location code 102 when the user is within the area of the local system. In this the second embodiment for message input, the required coding changes are transparent to the call originator, while the message may be delivered anywhere in the world.

Figure 7:
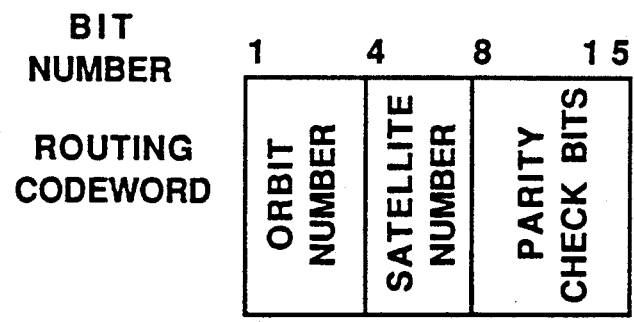
FIG. 7 is a timing diagram illustrating the format for satellite routing in the satellite based communication system of the present invention.

As previously described, satellite routing information is added at the trunk station prior to the up-link transmission to the satellites overhead. The format of the satellite routing codeword are shown in FIG. 7. It will be appreciated the format of the codeword shown is for example only, as other codeword formats may be provided depending upon the number of satellites and orbits provided within the satellite system. As the messages are received at the trunk station, the country code and location code are evaluated to determine which satellite will be in a position to deliver the message at the earliest possible time. The routing code provides an orbit number 108 and satellite number 110 of the satellite that will be scheduled to deliver the message. The delivery satellite selection is based upon a number of factors, such as whether the system is synchronous or non-synchronous, and the time to transmit the messages to the satellites and to route the messages through the satellite system. The messages are transmitted from the trunk station to the receiving satellite currently overhead in data packets containing a predetermined number of messages. After the data packet has been received by the receiving satellite, the routing code for each of the predetermined number of messages is processed to determine the routing through the intersatellite communication system for each message. Depending on the grouping of messages for the various geographic areas, it will be appreciated there can be numerous routes initiated by the receiving satellite.

In an alternate embodiment of the present invention, the routing code, rather than being determined at the trunk station, is determined by the receiving satellite. This embodiment reduces the amount of information which must be transmitted from the trunk station to the satellites, but as it will be appreciated, increases the complexity of the processing required by each satellite.

Figure 8A:
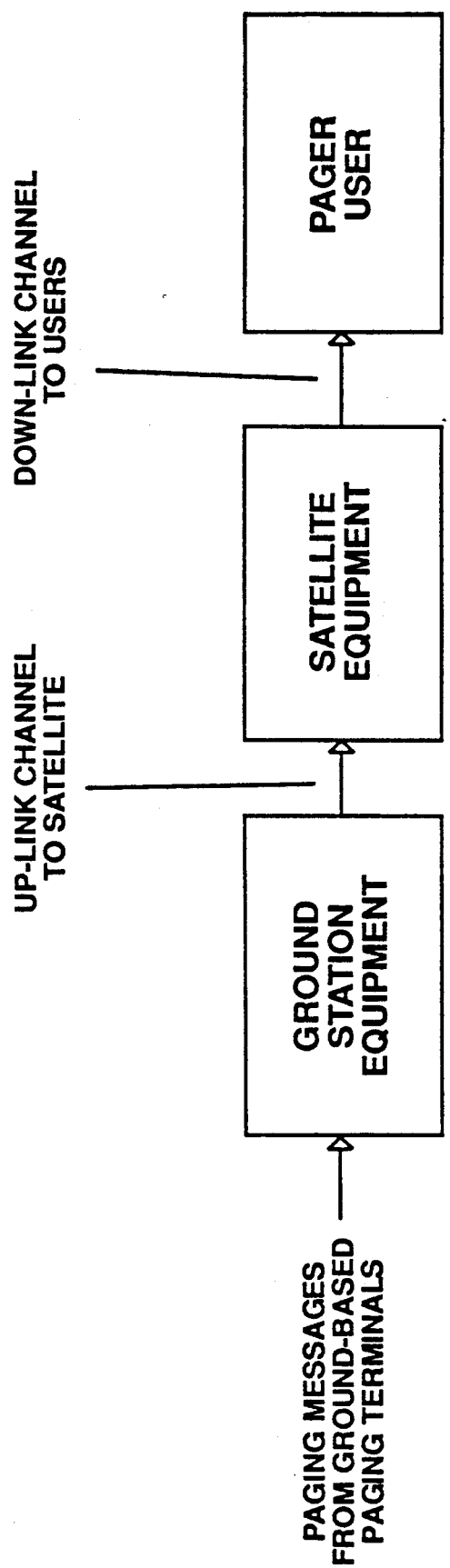
FIG. 8A shows a simplified block diagram depicting the flow of the message information through the satellite based communication system of the present invention.

FIG. 8A shows a simplified block diagram depicting the flow of the message information through the satellite based communication system. The paging messages received at the local input nodes via the public switched telephone network are received by the trunk station. The messages are processed, as previously described, by the ground station equipment described in FIG. 8B. The processed messages are transmitted to the satellites in data packets via an up-link channel as each new satellite appears substantially overhead, as in the case of a non-synchronous satellite system. The received data packets are processed by the satellite equipment described in FIG. 8C. This processing includes such steps as the selection of the transmission frequency, and encoding of the message information into the signaling protocol required for the geographic delivery area. At the appropriate time, the satellite beams down the messages using a down-link channel set to the proper frequency for the geographic area. The messages after they have been beamed down, are received by pagers operable in the satellite system, whereupon the user is alerted for having received the message.

Figure 8B:
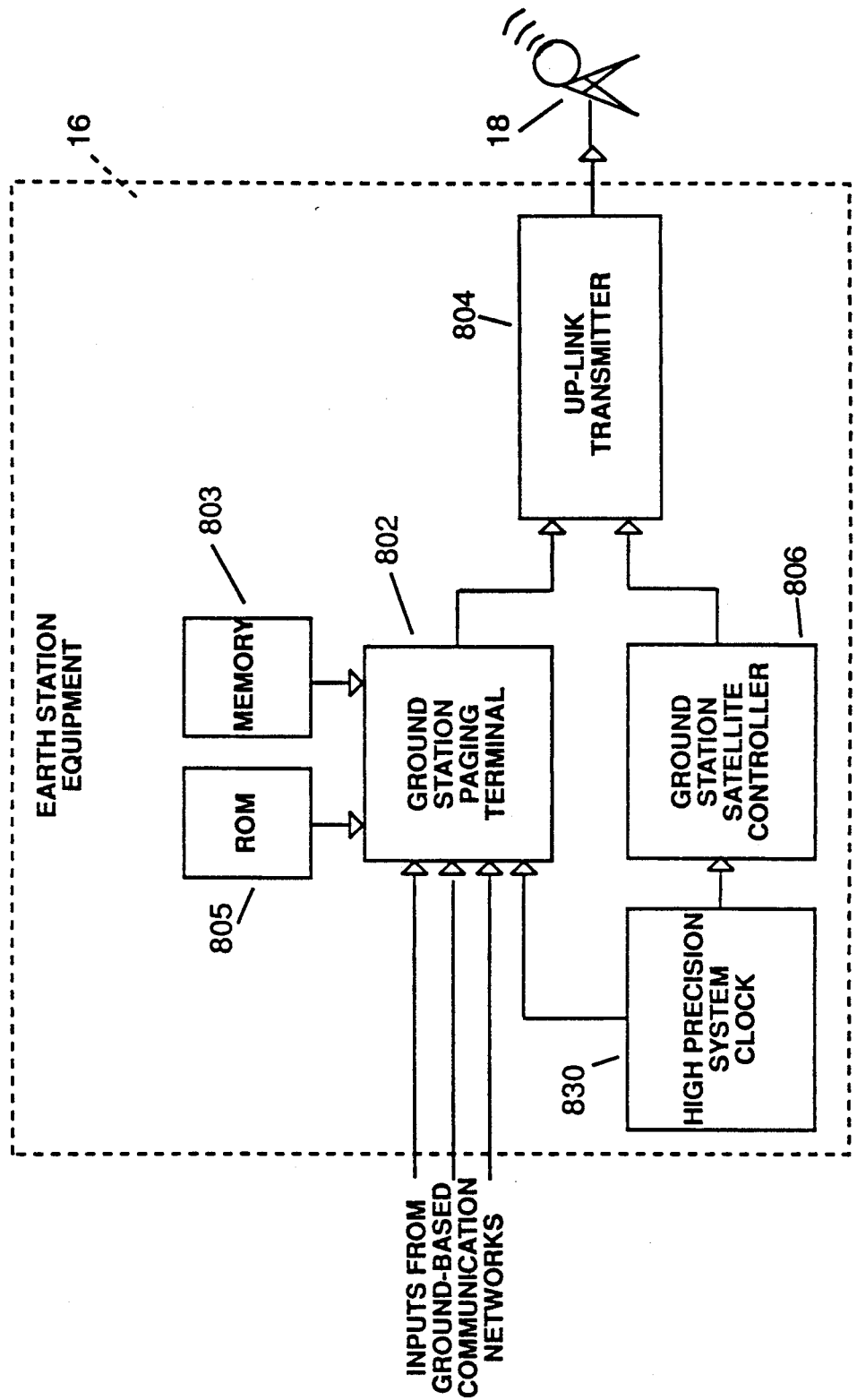
FIG. 8B is an electrical block diagram illustrating the apparatus of the trunk station for the satellite based communication system of the present invention.

FIG. 8B is a block diagram illustrating the apparatus of the trunk station 16 for the satellite based communication system of the present invention providing geographical protocol conversion. Messages transmitted through the global satellite network are received at the trunk station 16 by the ground station paging terminal 802 through one or more inputs. As previously described, the message information delivered to the inputs may be delivered via landline, or microwave or satellite communication, or any combination thereof. The ground station paging terminal 802 receives the message information in a manner well known in the art, temporarily storing the information in ground station memory 803 in an active message file, or queue. Ground station memory 803 provides non-volatile storage of the received message information, such as provided by a hard disk memory. As previously described the country code and location code information added by the terminal at the local input node, is processed and the appropriate routing code for each message received is determined and added to the corresponding message data stored in the active message queue. The routing information is determined from satellite network information stored in read only memory (ROM) 805 and the known current position of each of the satellites around the world.

The format of the information of the active message queue is essentially the same as when originally entered into the system, in a BCD or ASCII format together with the added codewords for satellite routing, as previously described. At the appropriate time, as determined from the high precision system clock 830 which couples to the ground station paging terminal 802, the active message queue is recovered from ground station memory 803 by the ground station paging controller 802, and is transmitted by up-link transmitter 804 as a message data packet having a predetermined number of messages using directional antenna 18 and conventional telemetry techniques to the satellite appearing substantially overhead. In addition to the transmission of the active message queue to each satellite as they appear substantially overhead, a ground station controller 806 generates control data for transmission via the up-link transmitter 804 for controlling the operation of the satellite and its on-board systems. It will be appreciated, the message data packet size is determined by the time the satellite remains substantially overhead and is in a position to receive information, and the time remaining after the satellite control information has been transmitted.

Figure 8C:
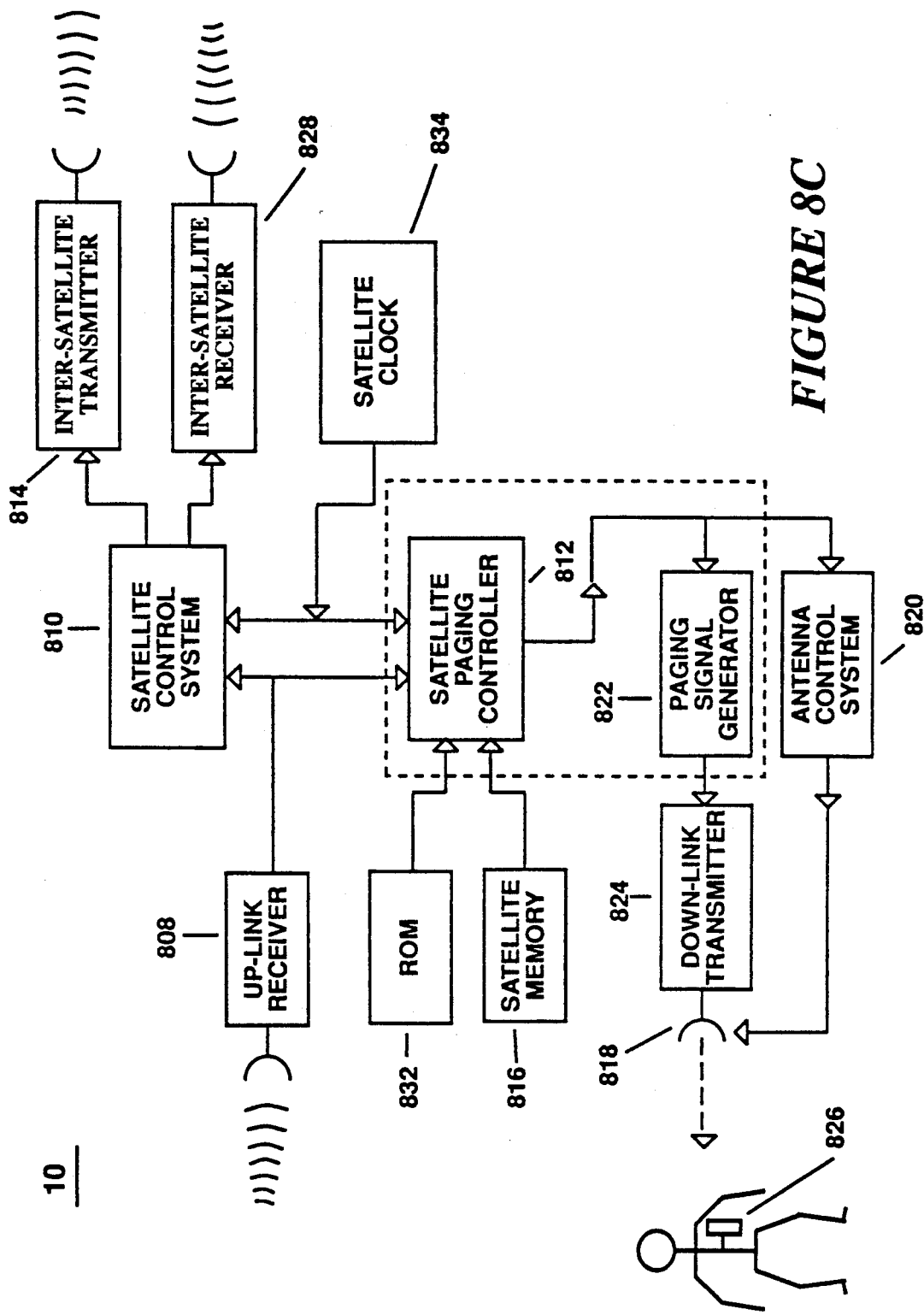
FIG. 8C is an electrical block diagram illustrating the apparatus of the satellites for the satellite based communication system of the present invention.

FIG. 8C is a block diagram illustrating the apparatus for each of the satellites of the present invention. The control information and data packets transmitted from up-link transmitter 804 are received by the satellite 10 by up-link receiver 808. The control information is processed in a manner well known to one skilled in the art by the satellite control system 810, controlling such satellite parameters as satellite orientation and altitude. The message information is processed by the satellite paging controller 812. When the routing code is included in the message data packet, the paging satellite controller 812 determines which of the nearest satellites will be used in routing the message information not intended for transmission by the receiving satellite. The intersatellite message routing is determined from satellite network information stored in the satellite read only memory (ROM) 832. The message information intended for transmission by the other satellites can be transmitted to the appropriate nearest satellite using intersatellite transmitter 814, or may be temporarily stored in satellite memory 816 until all the received message information has been processed, after which the data may be transmitted in batches to the appropriate nearest satellites.

The message information intended to be transmitted by the receiving satellite is further processed by satellite paging controller 812 for country code and location code to determine when the transmission of the message information will occur. The message information is then temporarily stored in memory 816 until the appropriate transmission time is reached. The transmission time is determined from the satellite control system 810 which receives timing information from satellite clock 834 to determined the satellites current position around the world. The satellite control system 810 generates periodic position signals which are coupled to satellite paging controller 812, thereby allowing the satellite paging controller to determine the protocol requirements for each geographical area from protocol information stored in satellite ROM 832. As the satellite travels over each geographic area during which down-link transmissions are to be made, the satellite paging controller 812 controls the down-link antenna 818 direction via antenna control system 820. Any message information which is stored in memory 816 will be recovered at the appropriate time by satellite paging controller 812 from satellite memory 816 and supplied to paging signal generator 822. The paging signal generator 822 provides a programmable encoding means for encoding the message information which was received in the first predetermined signaling format, as previously described, and encodes the message information into a second predetermined signaling format corresponding to the signaling protocol utilized in each geographic area to which the satellite antenna is directed. Satellite paging controller 812 also controls the transmission frequency of down-link transmitter 824 thereby allowing the message information encoded in the signaling protocol for the particular geographic area to be transmitted on the down-link frequency appropriate for the particular geographic area. The transmitted message information can then be received by the paging receiver 826 anywhere within the coverage area of the antenna beam.

When message information is routed from one satellite to the next, the routed message information is received by intersatellite receiver 828. Satellite paging controller processes the received message information to determined if the received information is intended to be transmitted from the receiving satellite, or if the message information is to be routed to the next satellite in the present orbit, or in an adjacent orbit. Message information intended to be transmitted by the receiving satellite is stored as previously described and transmitted at the appropriate time as previously described. Message information not intended to be transmitted by the receiving satellite is routed to the next satellite also as previously described. While only a single intersatellite transmitter and receiver are shown in FIG. 8C, it will be appreciated multiple transmitters and receivers will be required to provide intersatellite communication between satellites is a given orbit and with satellites in different orbits.

Figure 9:
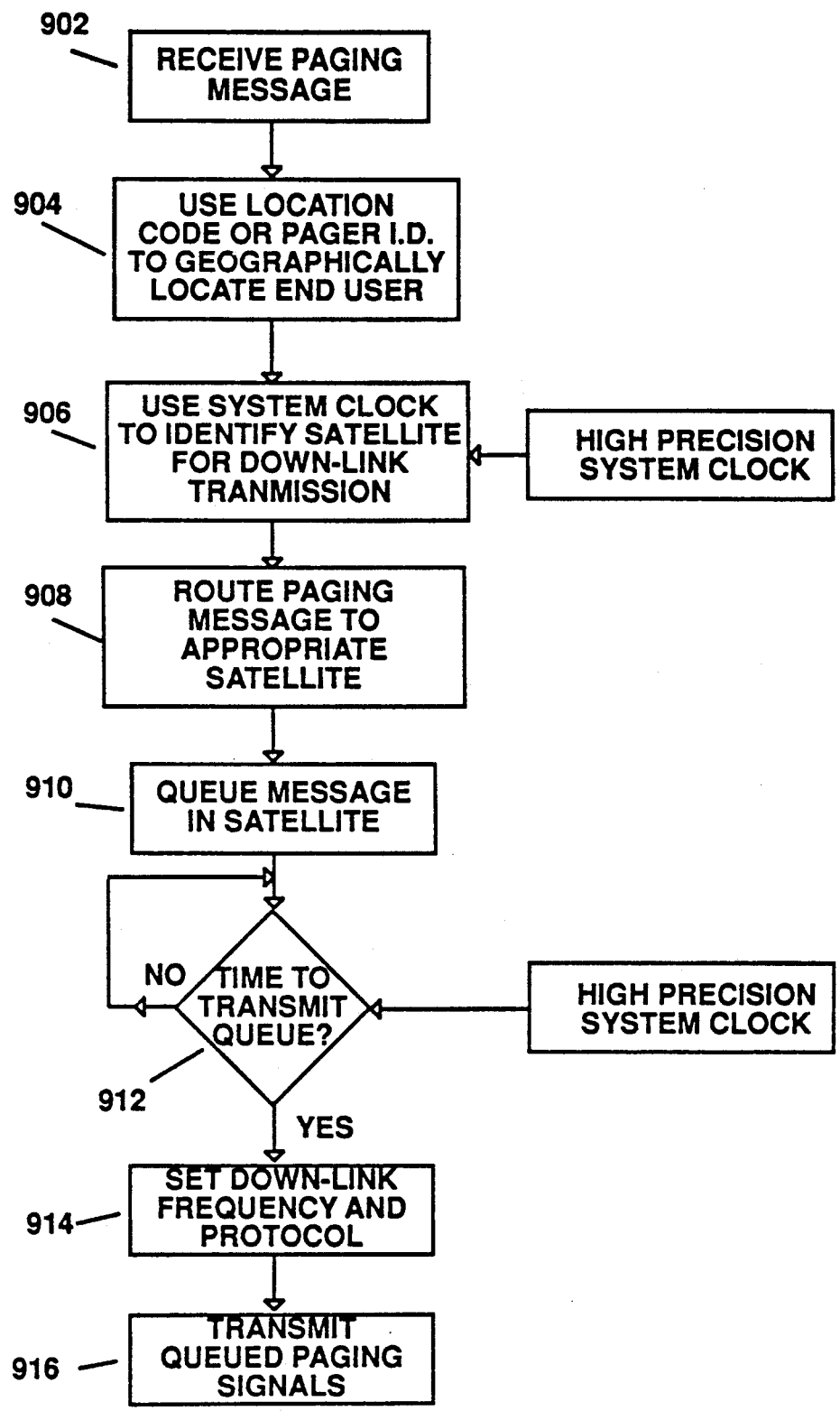
FIG. 9 is a flow chart illustrating the message flow for the satellite based communication system of the present invention.

FIG. 9 is a flow chart of the message processing for the satellite based communication system providing geographical protocol conversion of the present invention. When a message is received at any of the local input nodes, at block 902, the local terminal determines the present status of the pager for which the message is intended, i.e. whether the pager is currently assigned to receive the messages through the local paging system, or through the satellite based communication system. When the message is to be delivered through the satellite based communication system, at block 904, a country codeword and a location codeword are assigned and are added to the message, when such automatic assignment is provided, or the location codeword entered with the message is processed to determine the assigned country codeword and location codeword. The message information is then forwarded to the trunk site for transmission to the satellites.

When the trunk site receives the message information, the country codeword and location codeword are processed to identify the satellite routing information, at block 906. The satellite routing information is determined from the present location of each of the satellites in orbit, and the time required required to deliver the message information to the appropriate satellite for down-link transmission using the system clock.

The message information is next transmitted as a data packet to the next satellite appearing substantially overhead the trunk site. The receiving satellite processes the routing information, at block 908, to determine whether the message is to be delivered from the receiving satellite, or any other satellite. When the message is received at the appropriate satellite for down-link transmission, the message is queued, at block 910, for subsequent transmission. When the transmission time is reached, at block 912, which indicates the satellite is over the correct geographical area, the down-link transmitter frequency is set and the programmable encoder is set for the signaling protocol required for the particular geographical area, at block 914. The message information is encoded into the correct signaling protocol, and transmitted via the down-link transmitter, at block 916, to the pager for which the message is intended, which is now located in the current transmission area.

Figure 10:
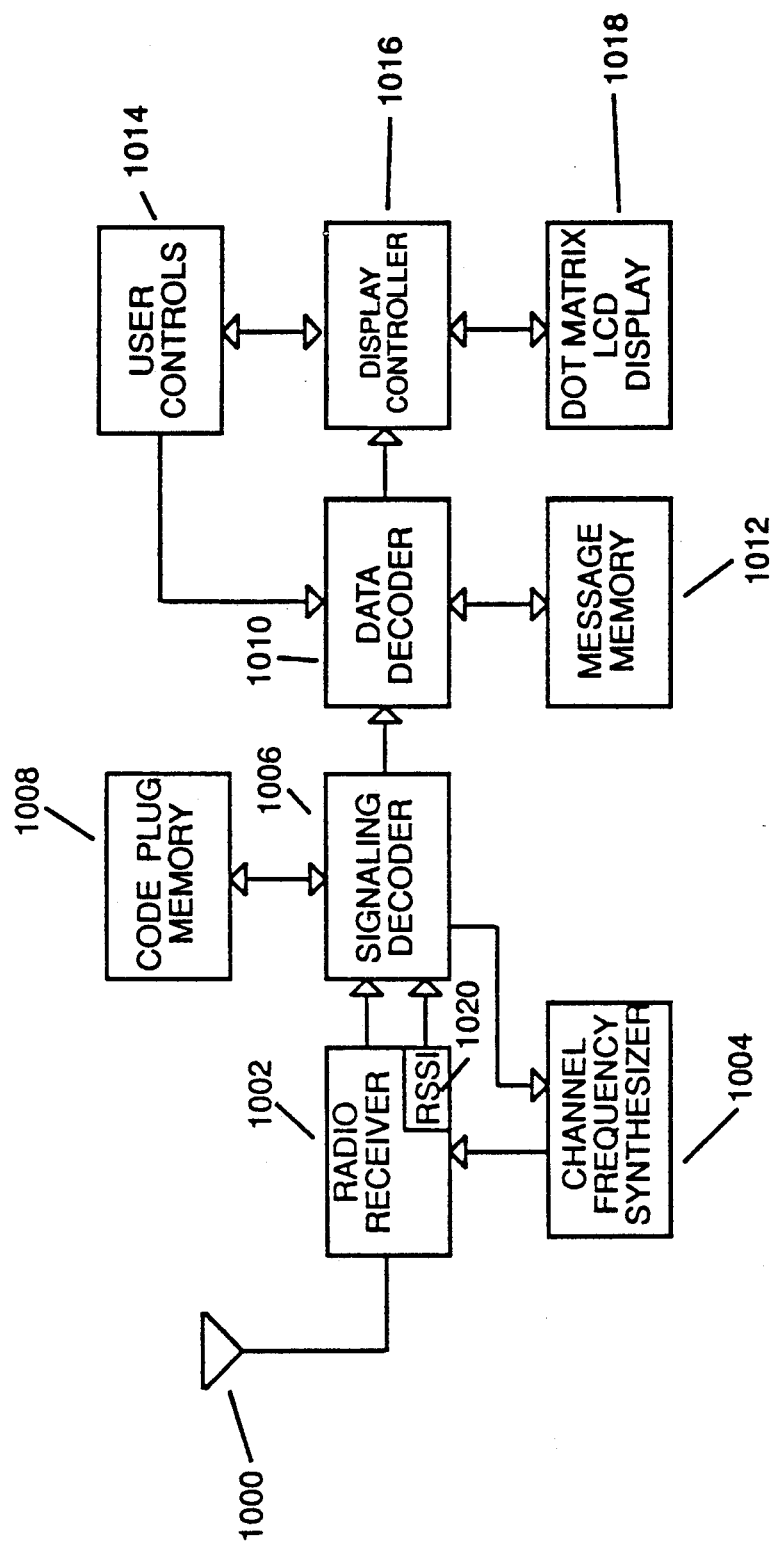
FIG. 10 is an electrical block diagram of a portable communication receiver for use in the satellite based communication system of the present invention.

FIG. 10 shows an electrical block diagram of a portable communication receiver for use in the satellite based communication system of the present invention. Data packets containing paging addresses and message directed to pagers located in particular geographic areas are beamed down to the pagers in the second predetermined signaling format, corresponding to the signaling format to which the pager decoder is responsive. The data packets are intercepted by the pager antenna 1000 for reception by receiver 1002. Receiver 1002 is a conventional FM receiver operating, preferably in the 900 MHz to 2.0 GHz frequency range. The choice of operating frequency is controlled by the ITU and national regulatory agencies as previously described, and is controlled by channel frequency synthesizer 1004 in a manner well known in the art. The output of receiver 1002 is a stream of binary data corresponding to the received data packet information. The stream of binary data is applied to the input of signaling decoder 1006, where the data is processed in a manner well known in the art. Since the data packets received may be transmitted in any of a plurality of signaling formats, such as the Golay Sequential Code (GSC) or POCSAG signaling formats, data decoder 1010 is adaptive to decode either signaling format. One such adaptive decoder is described in U.S. Pat. No. 4,518,961 to Davis et al, entitled "Universal Paging Device with Power Conservation" which assigned to the assignee of the present invention and which is incorporated by reference herein. The decoder may also adapt to the proper signaling format based on a received codeword from the satellite, such as the country code or location code codewords previously described. When an address is received in the transmitted data packet which corresponds to an address stored in code plug memory 1008, the signaling decoder 1006 generates a control signal enabling the operation of the data decoder 1010. The received message is processed by the data decoder 1010 which converts the message information received in the predetermined signaling format, to BCD or ASCII data which is then stored in the message memory 1012. Upon completion of the processing of the message information, the user is sensibly alerted by an alerting means (not shown) which couples to the signaling decoder 1006, such as by an audible tone, or a tactile vibration to indicate a message has been received. Upon being alerted, the user can read the stored message by means of user controls 1014. The user controls 1014 also provide the user such additional capability as to reset the audible or tactile alert, place the receiver in a deferred page mode, erase the message, and protect the message in a manner well known in the art. The message read from message memory 1012 is supplied to display controller 1016 which provides the necessary conversion from the BCD or ASCII data to that required for display of the message on display 1018. Display 1018 is preferably an LCD display, such as a dot matrix LCD display capable of displaying alphanumeric message information. The recovery of message information from the message memory 1012 and display of the recalled message information is well known in the art.

In normal operation, the receiver is assigned to a home channel for normal operation using a conventional paging system. Or in those instances where no conventional paging system exists, the receiver may be assigned to a home operating frequency for the delivery of messages from the satellite. The choice of the home channel for normal operation is determined by information periodically transmitted on the home channel in a manner well known in the art. However, once the pager user leaves the immediate geographic area covered by the home channel.

A global satellite based communication system providing geographic protocol conversion has been described. In this system messages intended for delivery to a pager located anywhere on earth are transmitted to satellites operating in synchronous or non-synchronous orbits in a first signaling format which provides high message throughput. The messages are then transmitted by the satellites using a down-link frequency and conventional signaling protocols to earth based receivers corresponding to each geographical area over which the satellites pass.

While a specific embodiment of this invention has been shown and described, further modifications and improvements will occur to those skilled in the art. All modifications which retain the basic underlying principles disclosed and claimed herein are within the scope and spirit of the present invention.

We claim:

1. A satellite paging system providing geographic protocol conversion for data packet delivery to a plurality of geographic areas, said satellite based communication system comprising:
   transmission means, for transmitting data packets to the communication satellite, the data packets being transmitted in a first predetermined data format;
   a satellite having,
      satellite receiving means, for receiving the transmitted data packets transmitted in the first predetermined data format;
      programmable encoding means, coupled to said receiving means, for encoding the received data packets transmitted in the first predetermined data format into encoded data packets in a second predetermined data format corresponding to the signaling requirements of each geographic delivery area;
      satellite transmitting means, coupled to said encoding means, for transmitting the encoded data packets in the second predetermined data format; and
   a portable communication receiver, operable in the second predetermined data format in the geographic delivery area, for receiving the encoded data packets transmitted in the second predetermined data format,
   whereby data packets transmitted to said satellite in the first predetermined data format are converted within said satellite to the second predetermined data format conforming to the signaling requirements for transmission to said portable communication receiver in the geographic delivery area.

2. The global satellite paging system according to claim 1, further comprising:
   memory means, for storing a table correlating correlating the required second predetermined data format to each geographical delivery area; and
   controller means, coupled to said programmable encoding means and to said memory means, for controlling the encoding of the data packets received in the first predetermined data format into data packets encoded in the second predetermined signaling format based on the current geographical delivery area.

3. The global satellite paging system according to claim 2, wherein said satellite transmitter means is capable of transmitting on a plurality of frequencies, and said memory means further stores a table correlating transmitter frequency to the geographic location information, and wherein said controller means is further responsive to the geographic location information to transmit the data packets on one or more of the plurality of frequencies for each of the plurality of geographic delivery areas.

4. The global satellite paging system according to claim 1 wherein the data transmitted in the first predetermined data format is ASCII encoded data.

5. The global satellite paging system according to claim 1 wherein the data transmitted in the second predetermined data format is encoded in the POCSAG signaling format.

6. The global satellite paging system according to claim 1 wherein the data transmitted in the second predetermined data format is encoded in the Golay Sequential Code signaling format.

7. The global satellite paging system according to claim 1, wherein said satellite orbits in a synchronous orbit.

8. The global satellite paging system according to claim 7, wherein the satellite paging system includes a plurality of satellites orbiting in synchronous orbits, and each of said satellites further comprising inter-satellite communication means for forwarding the data packet received in the first predetermined data format to an adjacent satellite.

9. A satellite paging system providing geographic protocol conversion for data packet delivery to a plurality of geographic areas, said satellite based communication system comprising:

earth based satellite station, having
  receiving means, for receiving information data packets transmitted in a first predetermined data format;
  programmable encoding means, coupled to said receiving means, for encoding the received information data packets transmitted in the first predetermined data format into data packets encoded in a second predetermined data format corresponding to the signaling requirements of each geographic delivery area;
  transmission means, for transmitting data packets to the communication satellite, the data packets being transmitted in the second predetermined data format;

a satellite having,
  satellite receiving means; for receiving the transmitted data packets transmitted in the first predetermined data format;
  satellite transmitting means, coupled to said encoding means, for transmitting the encoded data packets in the second predetermined data format; and a portable communication receiver, operable in the second predetermined data format in the geographic delivery area, for receiving the encoded data packets transmitted in the second predetermined data format, whereby data packets received at said earth based satellite station in the first predetermined data format are transmitted to said satellite in the second predetermined data format conforming to the signaling requirements for transmission to said portable communication receiver in the geographic delivery area.

10. The global satellite paging system according to claim 9, further comprising:
  memory means, for storing a table correlating correlating the required second predetermined data format to each geographical delivery area; and
  controller means, coupled to said programmable encoding means and to said memory means, for controlling the encoding of the data packets received in the first predetermined data format into data packets encoded in the second predetermined signaling format based on the current geographical delivery area.

11. The global satellite paging system according to claim 10, wherein said satellite transmitter means is capable of transmitting on a plurality of frequencies, and said memory means further stores a table correlating transmitter frequency to the geographic location information, and wherein said controller means is further responsive to the geographic location information to transmit the data packets on one or more of the plurality of frequencies for each of the plurality of geographic delivery areas.

12. The global satellite paging system according to claim 9 wherein the data transmitted in the first predetermined data format is ASCII encoded data.

13. The global satellite paging system according to claim 9 wherein the data transmitted in the second predetermined data format is encoded in the POCSAG signaling format.

14. The global satellite paging system according to claim 9 wherein the data transmitted in the second predetermined data format is encoded in the Golay Sequential Code signaling format.

15. The global satellite paging system according to claim 9, wherein said satellite orbits in a synchronous orbit.

16. The global satellite paging system according to claim 15, wherein the satellite paging system includes a plurality of satellites orbiting in synchronous orbits, and each of said satellites further comprising inter-satellite communication means for forwarding the data packet received in the first predetermined data format to an adjacent satellite.

17. A communication satellite providing geographic protocol conversion for data packet delivery to portable communication receivers located in a plurality of geographic areas, comprising:

satellite receiving means; for receiving data packets transmitted in a first predetermined data format;
programmable decoding means, coupled to said satellite receiving means, for decoding the received data packets transmitted in the first predetermined data format to provide decoded data packets;
programmable encoding means, coupled to said decoding means, for encoding the decoded data packets into data packets encoded in a second predetermined signaling format corresponding to the signaling requirements of each geographic delivery area; and
satellite transmitting means, coupled to said encoding means, for transmitting the data packets encoded in the second predetermined signaling format;

whereby packetized data received by the satellite in a first predetermined signaling format is converted within the satellite to a second predetermined signaling format for data packet retransmission conforming to the signaling requirements for transmission to the portable communication receivers in the geographic delivery area.

18. The communication satellite according to claim 17, further comprising:
  memory means, for storing a table correlating correlating the required second predetermined data format to each geographical delivery area; and
  controller means, coupled to said programmable encoding means and to said memory means, for controlling the encoding of the data packets received in the first predetermined data format into data packets encoded in the second predetermined signaling format based on the current geographical delivery area.

19. The communication satellite according to claim 17, further comprising:
  satellite timing means, for generating timing information signals;
  memory means, for storing a table correlating the timing information signals to the plurality of geographic delivery areas, said memory means further for storing a table correlating the required second predetermined data format to each geographical delivery area; and
  controller means, coupled to said programmable encoding means and to said memory means, and responsive to the timing information signals, for determining the current geographical delivery area, said controller means further for controlling the encoding of the data packets received in the first predetermined data format into data packets encoded in the second predetermined signaling format based on the current geographical delivery area.

20. The communication satellite according to claim 18, wherein said satellite transmitter means is capable of transmitting on a plurality of frequencies, and said memory means further stores a table correlating transmitter frequency to the geographic location information, and wherein said controller means is further responsive to the geographic location information to transmit the data packets on one or more of the plurality of frequencies for each of the plurality of geographic delivery areas.

21. The communication satellite according to claim 19, wherein said satellite transmitter means is capable of transmitting on a plurality of frequencies, and said memory means further stores a table correlating transmitter frequency to the geographic location information, and wherein said controller means is further responsive to the geographic location information to transmit the data packets on one or more of the plurality of frequencies for each of the plurality of geographic delivery areas.

22. The communication satellite according to claim 17 wherein the data transmitted in the first predetermined data format is ASCII encoded data.

23. The communication satellite according to claim 17 wherein the data transmitted in the second predetermined data format is encoded in the POCSAG signaling format.

24. The communication satellite according to claim 17 wherein the data transmitted in the second predetermined data format is encoded in the Golay Sequential Code signaling format.

25. The communication satellite according to claim 17, wherein the satellite paging system includes a plurality of satellites.

26. The communication satellite according to claim 25, wherein said plurality of satellites orbit in synchronous orbits.

27. The communication satellite according to claim 26, wherein each of said satellites further comprising inter-satellite communication means for forwarding the data packet received in the first predetermined data format to an adjacent satellite.

28. The communication satellite according to claim 25, wherein said plurality of satellite orbit in non-synchronous orbits.

29. The communication satellite according to claim 28, wherein each of said satellites further comprising inter-satellite communication means for forwarding the data packet received in the first predetermined data format to an adjacent satellite.

30. A global satellite paging system providing geographic protocol conversion for data packet delivery to a plurality of geographic areas, each of the plurality of geographical areas requiring data packet transmission in one of a plurality of different signaling formats, said satellite based communication system comprising:
   earth based satellite station, having
      receiving means, for receiving information data packets transmitted in a first predetermined data format;
      programmable encoding means, coupled to said receiving means, for encoding the received information data packets transmitted in the first predetermined data format into data packets encoded in a second predetermined data format corresponding to the signaling requirements for each geographic delivery area;
      transmission means, for transmitting the encoded data packets to a predetermined one of the plurality of communication satellites, the data packets being transmitted in the second predetermined data format;
   a plurality of satellites orbiting in the plurality of predetermined orbital planes, each having
      satellite receiving means; for receiving the transmitted data packets transmitted in the second predetermined data format;
      satellite transmitting means, coupled to said satellite receiving means, for transmitting the encoded data packets in the second predetermined data format; and
   a portable communication receiver, operable in the second predetermined data format in the geographic delivery area, for receiving the encoded data packets transmitted in the second predetermined data format,
   whereby data packets received at said earth based satellite station in a first predetermined data format are converted to the second predetermined data format conforming to the requirements for transmission to said portable communication receiver in the geographic delivery area.

31. The global satellite paging system according to claim 30, further comprising:
   satellite timing means, for generating timing information signals;
   memory means, for storing a table correlating the timing information signals to the plurality of geographic delivery areas, said memory means further for storing a table correlating the required second predetermined data format to each geographical delivery area; and
   controller means, coupled to said programmable encoding means and to said memory means, and responsive to the timing information signals, for determining the current geographical delivery area, said controller means further for controlling the encoding of the data packets received in the first predetermined data format into data packets encoded in the second predetermined signaling format based on the current geographical delivery area.

32. The global satellite paging system according to claim 31, wherein said satellite transmitter means is capable of transmitting on a plurality of frequencies, and said memory means further stores a table correlating transmitter frequency to the geographic location information, and wherein said controller means is further responsive to the geographic location information to transmit the data packets on one or more of the plurality of frequencies for each of the plurality of geographic delivery areas.

33. The global satellite paging system according to claim 30 wherein the data transmitted in the first predetermined data format is ASCII encoded data.

34. The global satellite paging system according to claim 30 wherein the data transmitted in the second predetermined data format is encoded in the POCSAG signaling format.

35. The global satellite paging system according to claim 30 wherein the data transmitted in the second predetermined data format is encoded in the Golay Sequential Code signaling format.

36. The global satellite paging system according to claim 30, wherein said plurality of satellite orbit in non-synchronous orbits.

37. The global satellite paging system according to claim 36, wherein each of said satellites further comprising inter-satellite communication means for forwarding the data packet received in the first predetermined data format to an adjacent satellite.

38. A global satellite paging system providing geographic protocol conversion for data packet delivery to a plurality of geographic areas, each of the plurality of geographical areas requiring data packet transmission in one of a plurality of different signaling formats, said satellite based communication system comprising:

earth based satellite station, having
receiving means, for receiving information data packets transmitted in a first predetermined data format;
transmission means, for transmitting the received data packets to a predetermined one of the plurality of communication satellites, the data packets being transmitted in the first predetermined data format;
a plurality of satellites orbiting in the plurality of predetermined orbital planes, each having
satellite receiving means; for receiving the transmitted data packets transmitted in the first predetermined data format;
programmable encoding means, coupled to said receiving means, for encoding the received data packets transmitted in the first predetermined data format into encoded data packets in a second predetermined data format corresponding to the signaling requirements of each geographic delivery area;
satellite transmitting means, coupled to said satellite receiving means, for transmitting the encoded data packets in the second predetermined data format; and
a portable communication receiver, operable in the second predetermined data format in the geographic delivery area, for receiving the encoded data packets transmitted in the second predetermined data format, whereby data packets transmitted to said satellite in the first predetermined data format are converted within said satellite to the second predetermined data format conforming to the signaling requirements for transmission to said portable communication receiver in the geographic delivery area.

39. The global satellite paging system according to claim 38, further comprising:
satellite timing means, for generating timing information signals;
memory means, for storing a table correlating the timing information signals to the plurality of geographic delivery areas, said memory means further for storing a table correlating the required second predetermined data format to each geographical delivery area; and
controller means, coupled to said programmable encoding means and to said memory means, and responsive to the timing information signals, for determining the current geographical delivery area, said controller means further for controlling the encoding of the data packets received in the first predetermined data format into data packets encoded in the second predetermined signaling format based on the current geographical delivery area.

40. The global satellite paging system according to claim 39, wherein said satellite transmitter means is capable of transmitting on a plurality of frequencies, and said memory means further stores a table correlating transmitter frequency to the geographic location information, and wherein said controller means is further responsive to the geographic location information to transmit the data packets on one or more of the plurality of frequencies for each of the plurality of geographic delivery areas.

41. The global satellite paging system according to claim 38 wherein the data transmitted in the first predetermined data format is ASCII encoded data.

42. The global satellite paging system according to claim 38 wherein the data transmitted in the second predetermined data format is encoded in the POCSAG signaling format.

43. The global satellite paging system according to claim 38 wherein the data transmitted in the second predetermined data format is encoded in the Golay Sequential Code signaling format.

44. The global satellite paging system according to claim 38, wherein said plurality of satellite orbit in non-synchronous orbits.

45. The global satellite paging system according to claim 44, wherein each of said satellites further comprising inter-satellite communication means for forwarding the data packet received in the first predetermined data format to an adjacent satellite.

46. The global satellite paging system according to claim 38, wherein each of said plurality of satellites orbits in non-synchronous orbits.

47. A method for providing geographic protocol conversion for data packet delivery to ground based communication receivers located in a plurality of geographic areas from a satellite paging system, said method comprising the steps of:
receiving the data for data packet delivery in a non-encoded format;
transmitting the non-encoded data from a ground based station to one or more satellites;
encoding the data within the satellite into the signaling protocol based on the geographic delivery area; and
transmitting the encoded data packet to the ground based communication receivers in the geographic delivery area.

48. The method according to claim 47 further comprising the step of setting the transmitter operating frequency corresponding the the geographic delivery area.

* * * * *

UNITED STATES PATENT AND TRADEMARK OFFICE
CERTIFICATE OF CORRECTION

PATENT NO. : 5,008,952

DATED : April 16, 1991

INVENTOR(S) : Davis et al.

It is certified that error appears in the above-identified patent and that said Letters Patent is hereby corrected as shown below:

Column 14, line 29, delete "correlating" (second occurrence).

Column 15, line 44, delete "correlating" (second occurrence).

Column 16, line 45, delete "correlating" (second occurrence).

Signed and Sealed this

Twenty-seventh Day of October, 1992

Attest:

DOUGLAS B. COMER

*Attesting Officer*    Acting Commissioner of Patents and Trademarks